A. F. ELDER.
TRAP.
APPLICATION FILED APR. 10, 1909.

995,233.

Patented June 13, 1911.

3 SHEETS—SHEET 1.

Inventor
ABRAHAM F. ELDER.

Witnesses

A. F. ELDER.
TRAP.
APPLICATION FILED APR. 10, 1909.
995,233.
Patented June 13, 1911.
3 SHEETS—SHEET 2.
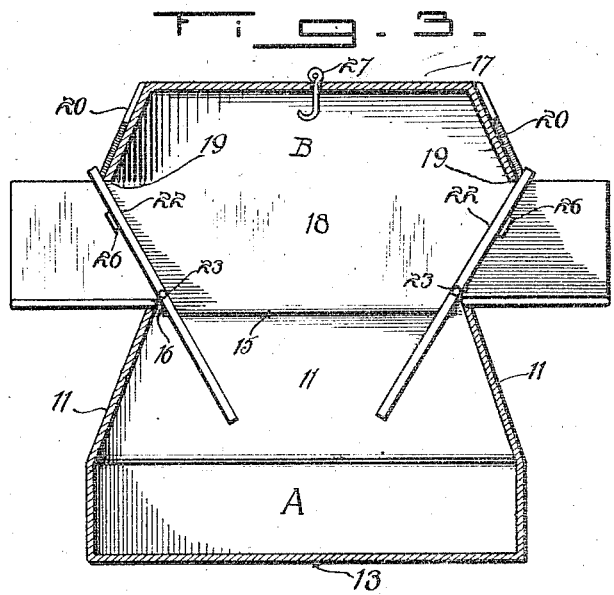
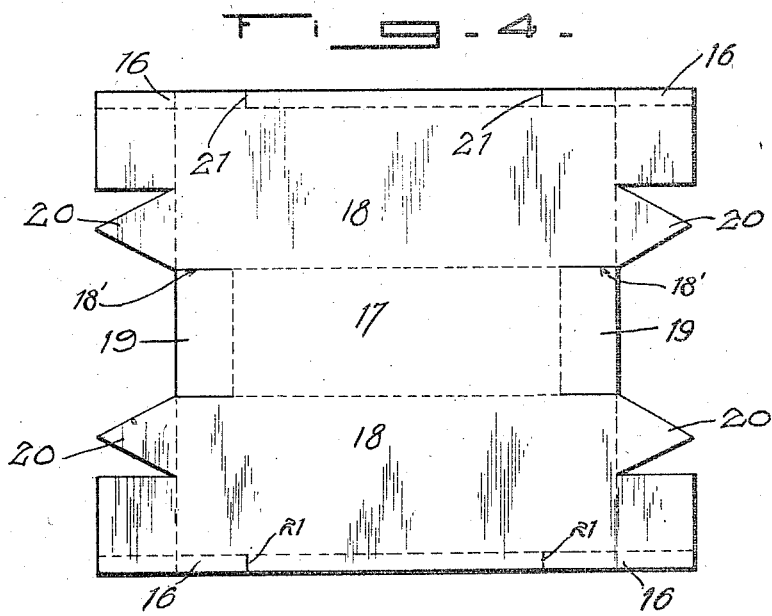
Witnesses
C. E. Chandlee.
E. L. Chandlee
Inventor
ABRAHAM F. ELDER.
By Woodward & Chandlee
Attorneys A. F. ELDER.
TRAP.
APPLICATION FILED APR. 10, 1909.
995,233.
Patented June 13, 1911.
3 SHEETS—SHEET 3.
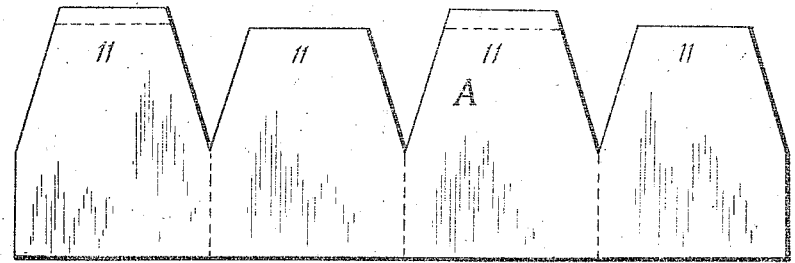
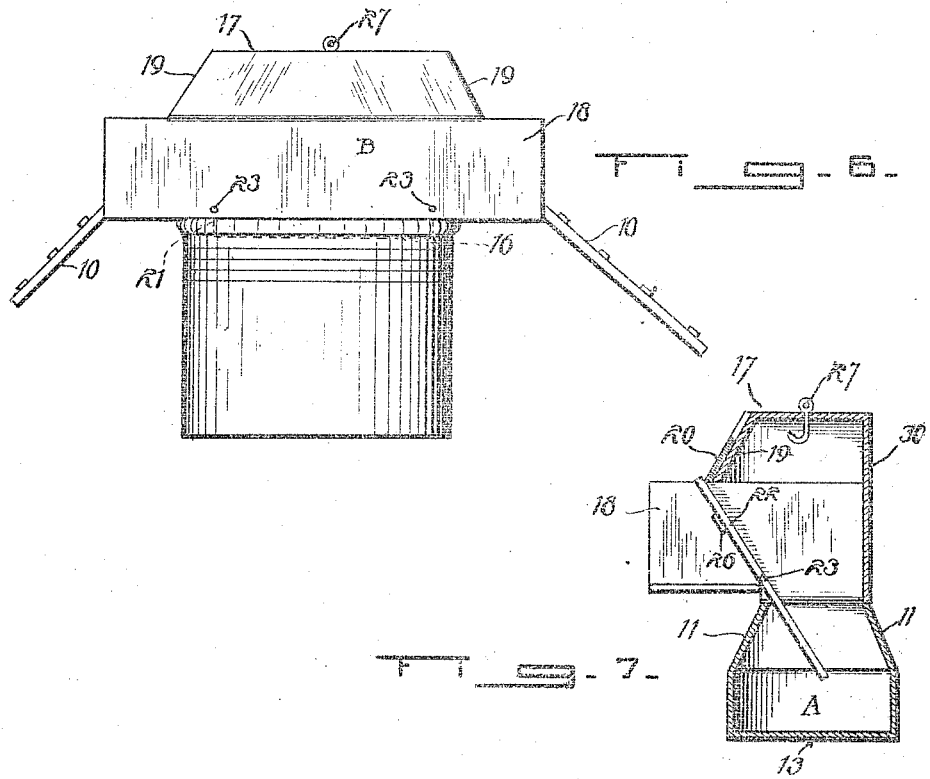
Inventor
ABRAHAM F. ELDER.
Witnesses
C. E. Chandler
E. L. Chandler
By Woodward & Chandler
Attorneys

UNITED STATES PATENT OFFICE.

ABRAHAM F. ELDER, OF SAWTELLE, CALIFORNIA.

TRAP.

995,233.

Specification of Letters Patent. Patented June 13, 1911.

Application filed April 10, 1909. Serial No. 489,062.

*To all whom it may concern:*

Be it known that I, ABRAHAM F. ELDER, a citizen of the United States, residing at Sawtelle, in the county of Los Angeles and State of California, have invented certain new and useful Improvements in Traps, of which the following is a specification.

This invention relates to traps, and more particularly to traps suitable for capturing small rodents.

An object of the invention is to provide a trap of simple construction adapted for positive operation.

Another object is to provide a tilting door trap which may be employed with various forms of receptacles if desired, though a specially coöperating receptacle is provided therefor.

Another important object of the invention is to provide a trap having parts so designed that they may be readily manufactured from stock material.

Other objects and advantages will be apparent from the following description, and it will be understood that changes in the specific structures shown and described may be made within the scope of the claims, and that any suitable materials may be used without departing from the spirit of the invention.

Figure 1:
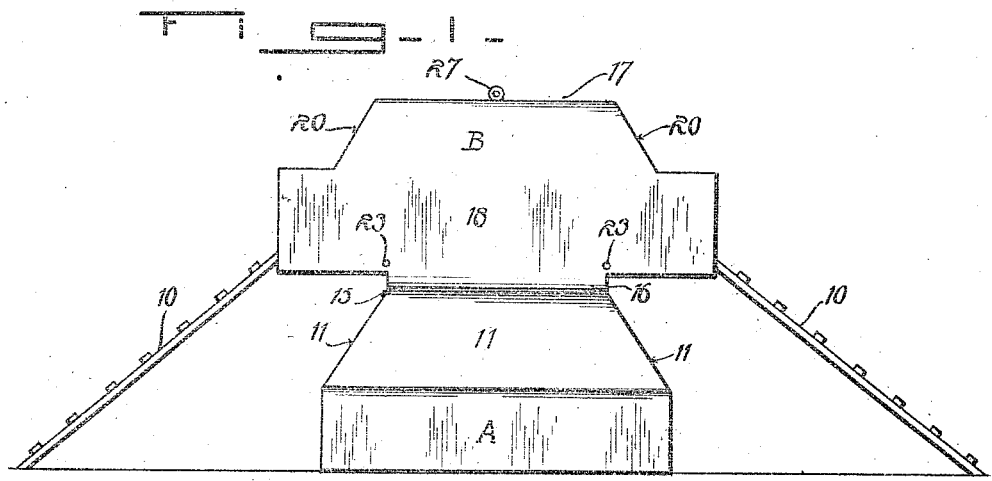
Figure 2:
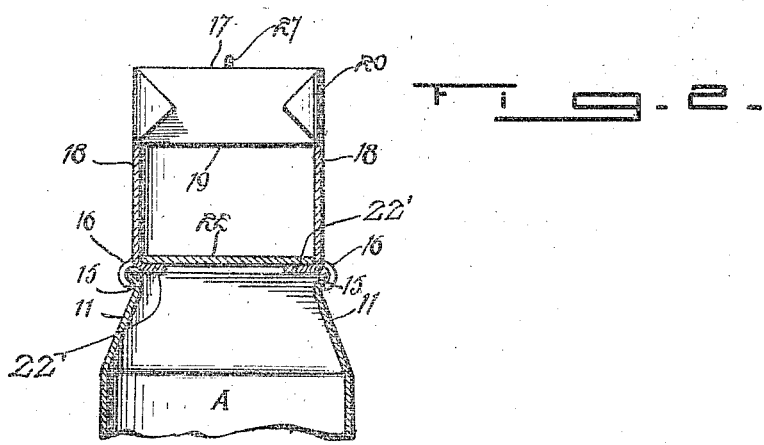

In the drawings forming a portion of this specification, and in which like numerals of reference indicate similar parts in the several views, Figure 1 is a side view of the trap and special receptacle, Fig. 2 is an end view partly in section of the trap and the upper portion of the receptacle, Fig. 3 is a longitudinal sectional view of the trap and receptacle in operative position, Fig. 4 is a plan view of the blank for the trap, Fig. 5 is a similar view of the blank for the receptacle, Fig. 6 illustrates the use of the trap without the special receptacle, Fig. 7 is a sectional view of a modified form of the device.

Referring to the drawings, there is shown a receptacle A upon which there is detachably mounted a trap B from each end of which inclined pathways 10 lead to the floor. The receptacle A is formed of a rectangular blank of sheet material, having on one side a plurality of tapering lateral extensions 11 having their adjacent side edges joined at their bases and being inclined inwardly. In the assembling of the receptacle, the opposite ends are secured in any suitable manner, and a suitable bottom 13 secured thereon. The members 11 are bent inwardly until their adjacent edges co-engage in proper registration and secured in a suitable manner. It will be noted that two of the opposite members 11 are extended upwardly beyond the remaining sides, and are turned sharply outward to form a rib 15 adapted for longitudinal slidable engagement with the side portions 16 formed on the trap A as will be subsequently described.

The trap B comprises a casing 17 formed of a single blank of sheet material approximately rectangular in shape, having its opposite edge portions bent downwardly a spaced distance from the center to form side walls 18. Longitudinally extending slits 18' are formed at the upper edges of the walls 18 extending inwardly from the ends of the casing. A portion of the central tongue 19 thus formed is cut away, and the remainder bent downwardly at an obtuse angle with respect to the top as shown in Fig. 3. The upper corner portions of the wall are then cut away with the exception of a tongue 20 which is secured over the portions 19 to hold them firmly in position. The lower edge portions of the wall 18 are slitted vertically a spaced distance from their ends as shown at 21, the central portion being turned outwardly and curved downwardly and inwardly to form a guide for engaging the ribs 15 carried by the receptacle, the outer end edges 22' being turned inwardly to form a supporting flange for tilting doors 22.

The doors 22 comprise rectangular blanks of sheet material having their opposite longitudinal edges bent downwardly and perforated centrally, and having revolubly engaged therethrough a shaft 23, carried adjacent the bottom edges of the walls 18 intermediately between its center and the opposite ends. An inclined entrance track 10 is carried at the opposite ends of the trap, and adapted to rest upon the floor or other support upon which the receptacle 11 is disposed. It will be noted that the outer ends of the doors 22 are provided with weights 26 adapted to hold them normally in horizontal position. It will also be noted that the inner ends of the doors may be deflected downwardly into the receptacle A, and when in this position, their outer ends will engage against the lower edge of the portion 19 of the roof of the trap, thus shutting out all light. Centrally of the roof of the casing 17, there is a bait engaging member 27 adapted to hold portions of bait for enticing animals to enter the trap, when their weight will deflect the doors 22 and precipitate them into the receptacle A.

It will be understood that the receptacle A may be partially filled with any suitable liquid or other substance for smothering or otherwise killing victims.

In Fig. 6, the trap is shown in operation over a common household receptacle, and in Fig. 7, there is illustrated a modified form of the device in which there is but one door 22, and a wall portion 30 is disposed transversely of the inner end of the door to check victims at the inner end of the door.

It will be noted that by having the walls of the receptacle A inclined inwardly as shown, and fitting the receptacle with a fluid reaching to the inclined wall, there is no possibility of an animal crawling up in the corners of the wall of the receptacle, and thus prolonging their suffering.

What is claimed is:—

1. A two part animal trap comprising a trap section formed of a single rectangular blank, the ends of said piece being formed with rectangular recesses, said piece having cuts arranged inwardly on lines continuous with the side walls of said recesses, the sides of said piece of material having cuts at equal distances from the ends thereof and parallel thereto, the portions between the last mentioned cuts adapted to be bent to form lips; and a receptacle section formed of a single blank having a series of V-shaped recesses in one of its longitudinal sides to produce tapering extensions, alternate ones of said extensions being longer than the remainder thereof.

2. A two part animal trap comprising a receptacle section formed of a single piece of material so folded as to form vertical side walls, upwardly and inwardly inclined top walls, certain of said inclined walls having lips formed on their upper ends; and a trap section formed of a single piece of material so folded as to form vertical side walls, inclined end walls, a horizontal roof connected to said vertical and inclined walls, said vertical walls projecting outwardly to form an entrance passage therebetween, lips formed on the lower edges of the vertical walls, adapted to engage the first named lips, and tilting floors pivoted between said side walls.

In testimony whereof I affix my signature, in presence of two witnesses.

ABRAHAM F. ELDER.

Witnesses:
Jos. Greenwood,
D. C. Hollershead.